United States Patent

Wakai et al.

[15] 3,657,577

[45] Apr. 18, 1972

[54] SYNCHRONIZING SIGNAL SEPARATING CIRCUIT

[72] Inventors: Shuzo Wakai, Kyoto; Mitsuo Nabae, Takatsuki, both of Japan

[73] Assignee: Matsushita Electronics Corporation, Osaka, Japan

[22] Filed: Apr. 23, 1971

[21] Appl. No.: 136,788

[52] U.S. Cl. ............................307/315, 178/7.3 S, 307/237, 307/254, 307/300, 328/139, 328/165

[51] Int. Cl. ..........................................................H03k 3/26

[58] Field of Search .......................178/DIG. 12, 7.3 S, 7.5 S; 307/237, 254, 300, 315; 328/165, 139

[56] References Cited

UNITED STATES PATENTS 2,663,806 12/1953 Darlington............................307/315
3,217,177 11/1965 Walker.............................307/215 X
3,256,502 6/1966 Momberger....................178/DIG. 12
3,428,746 1/1969 Graf...............................178/DIG. 12
3,548,097 12/1970 Thomas..............................178/7.3 S

*Primary Examiner*—Donald D. Forrer
*Assistant Examiner*—R. C. Woodbridge
*Attorney*—Stevens, Davis, Miller & Mosher

[57] ABSTRACT

A synchronizing signal separating circuit provided with a noise gating circuit, the gating period of which is sufficiently long compared with the pulse width of the input signal to the input terminal and which reliably suppresses noise. The noise gating circuit does not use any capacitor but consists of a Darlington circuit, which is very convenient for manufacturing the synchronizing signal separating circuit as an integrated semiconductor circuit.

2 Claims, 5 Drawing Figures

S. WAKAI
AND
M. NABAE
INVENTORS

BY Stevens, Davis, Miller & Mosher
ATTORNEYS

SYNCHRONIZING SIGNAL SEPARATING CIRCUIT

This invention relates to synchronizing signal separating circuits and more particularly to a synchronizing signal separating circuit, which is provided with a noise gating circuit and is suited for integration as an integrated semiconductor circuit.

The synchronizing signal separating circuit is usually provided with a self-biasing circuit to self-bias the base or emitter of a synchronizing signal separating transistor so that input variations can be followed automatically.

To facilitate understanding, description will now be made in connection with the accompanying drawing, in which.

Figure 1:
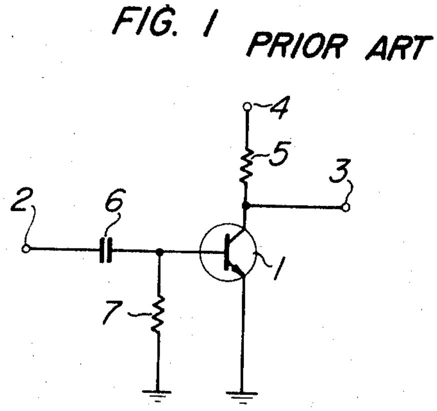
FIG. 1 PRIOR ART
FIGS. 1 and 2 are circuit diagrams showing conventional sync separators.

Referring to FIG. 1, there is shown a conventional sync separator with a self-base-biasing circuit. It comprises a sync separating transistor 1, an input terminal 2 receiving a composite video signal, a sync output terminal 3, a collector bias supply terminal 4, a collector-biasing resistor 5, and a self-base-biasing circuit consisting of capacitor 6 and resistor 7.

Figure 2:
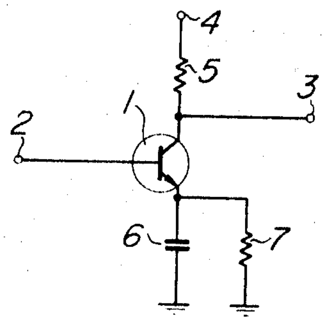
FIG. 2 PRIOR ART

FIG. 2 shows a conventional sync separator with a self-emitter-biasing circuit. In this circuit, a parallel circuit of capacitor 6 and resistor 7 is connected to the emitter of sync separating transistor 1.

In these sync separating circuits, the time constant of the self-biasing circuit determines the synch clipping level and the response characteristic of the circuits.

These sync separating circuits operate normally so long as normal video signal input prevails at the input terminal 2. However, when a noise of large amplitude appears at the input terminal 2, the capacitor 6 constituting the self-biasing circuit is overcharged so that the sync separating function is interrupted until the overcharge vanishes in accordance with the discharging characteristic of the self-biasing circuit of capacitor 6 and resistor 7. In order to prevent this overcharging of the capacitor 6, it has been proposed to provide a so-called noise gating circuit to bypass or gate a noise having an amplitude greater than that of the sync signal during the presence of an output of an amplitude detecting circuit, thereby cancelling or suppressing the noise.

Figure 3:
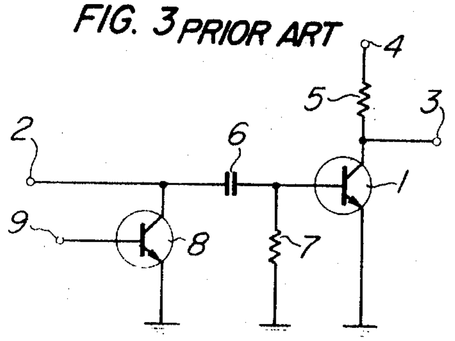
FIG. 3 PRIOR ART
FIG. 3 is a circuit diagram showing a conventional sync separator with a noise gating circuit.

FIG. 3 shows a conventional sync separator provided with such a noise gating circuit. A transistor 8 has it s collector-emitter circuit connected between the input terminal 2 and ground and its base connected to a terminal 9, to which the output of an amplitude detecting circuit (not shown) is coupled.

The amplitude detecting circuit provides output only when a noise having an amplitude greater than that of the sync signal is present. Upon appearance of this output the transistor 8 is triggered, reducing its collector potential nearly to ground potential, so that the noise reaching the input terminal 2 is bypassed through it, thus preventing overcharging of the capacitor 6 of the self-biasing circuit.

To ensure the prevention of overcharging, it is important that the conduction period (gate period) of the transistor 8 in the noise gating circuit is sufficiently long to completely cover the pulse width of the signal reaching the input terminal 2.

With the conventional noise gating circuit comprising only a single transistor, however, the above requirement cannot be completely satisfied.

To solve this problem, it is conceivable to incorporate a capacitance between the base and emitter or between the collector and base of the transistor 8. The addition of a capacitor, however, presents a technical difficulty in manufacturing the sync separator as an integrated semiconductor circuit. Even in this method it results in the increase of the manufacturing cost.

This invention is intended to overcome the above drawback in the conventional synchronizing signal separating circuit, and it features the use of a Darlington circuit in place of the transistor 8 shown in FIG. 3.

Figure 4:
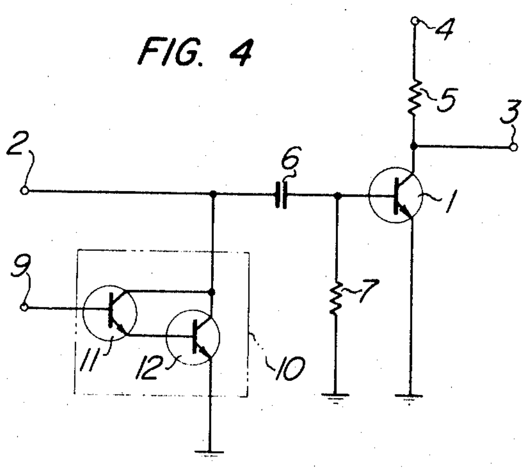
FIGS. 4 and 5 are circuit diagrams showing preferred embodiments of the sync separator provided with a noise gating circuit according to this invention.

FIG. 4 shows an embodiment of the synchronizing signal separating circuit according to this invention. It has a Darlington circuit 10 of transistors 11 and 12 connected between input terminal 2 and ground.

Figure 5:
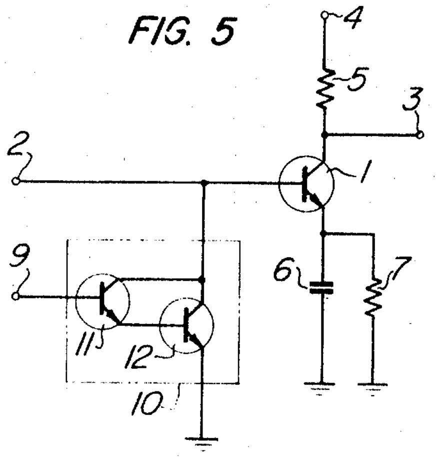

FIG. 5 shows another embodiment of this invention applied to a sync separator with a self-emitter-biasing circuit. In this embodiment, the Darlington circuit is also connected between the input terminal and ground.

With the noise gating circuit of the above construction according to this invention, the gate period is increased compared to the conventional arrangement. This is because the current amplification factor of the Darlington circuit of transistors 11 and 12 is extremely large compared with that of a single transistor since it is the product of the current amplification factors of the individual transistors 11 and 12. With the same base current the over-drive phenomenon is far pronounced in the Darlington circuit compared to the single transistor arrangement. In other words, the energy storage period is increased to extend the gate period. When the transistor 12 in the Darlington circuit is triggered and saturated, a certain amount of charge is stored in the base region of the transistor 12. Although the collector current through the transistor 12 seases upon cutting-off of the Darlington circuit due to subsequent reduction of the base potential of the transistor 12 to ground potential, the transistor 12 remains in the conduction state for a certain period until the charge stored in the base region of the transistor 12 is completely discharged. This period constitutes the storage period of the transistor 12. The charge stored in the base region of the transistor 12 is discharged in the direction opposite to the base current to the transistor 12, that is, it is discharged as a reverse base current. Since the base-emitter junction of the transistor 11 functions as a diode of reverse porarity to the reverse base current, it is very difficult and it requires a long time for the charge stored in the base region of the transistor 12 to be completely discharged. This accounts for the increased storage period and hence extended gate period.

As has been described in the foregoing, according to this invention with a noise gating circuit having a gate period sufficiently long compared with the pulse width of the signal appearing at the input terminal of the synchronizing signal separating circuit it is possible to reliably suppress noise to securely prevent overcharging of the capacitor of the self-biasing circuit. Also, since the noise gated circuit according to the invention consists of only transistors and does not include any capacitor, a sync separator having this noise gated circuit may be readily integrated into an integrated semiconductor circuit.

We claim:

1. A synchronizing signal separating circuit comprising a sync separating transistor, a self-base-biasing circuit connected between an input terminal and the base of said synch separating transistor, and a Darlington circuit, the collector-emitter circuit of one transistor of said Darlington circuit being connected between said input terminal and ground, said Darlington circuit being adapted to be triggered upon the appearance of a noise having an amplitude greater than that of the synchronizing signal at said input terminal.

2. A synchronizing signal separating circuit comprising a sync separating transistor having the base thereof connected to an input terminal, a self-emitter-biasing circuit connected between the emitter of said sync separating transistor and ground, and a Darlington circuit, the collector-emitter circuit of one transistor of said Darlington circuit being connected between said input terminal and ground, said Darlington circuit being adapted to be triggered upon the appearance of a noise signal having an amplitude greater than that of the synchronizing signal at said input terminal.

* * * * *